(12) United States Patent
Lee et al.

(10) Patent No.: US 10,010,981 B2
(45) Date of Patent: Jul. 3, 2018

(54) MATERIALS HAVING INCREASED MOBILITY AFTER HEATING

(75) Inventors: Ning-Cheng Lee, New Hartford, NY (US); Runsheng Mao, Clinton, NY (US)

(73) Assignee: Indium Corporation, Utica, NY (US)

( * ) Notice: Subject to any disclaimer, the term of this patent is extended or adjusted under 35 U.S.C. 154(b) by 2312 days.

(21) Appl. No.: 12/240,396

(22) Filed: Sep. 29, 2008

(65) Prior Publication Data
US 2009/0084469 A1 Apr. 2, 2009

Related U.S. Application Data

(60) Provisional application No. 60/975,912, filed on Sep. 28, 2007.

(51) Int. Cl.
*B23K 35/22* (2006.01)
*B23K 35/24* (2006.01)

(52) U.S. Cl.
CPC .............. *B23K 35/22* (2013.01); *B23K 35/24* (2013.01)

(58) Field of Classification Search
USPC .......................................................... 148/23
See application file for complete search history.

(56) References Cited

U.S. PATENT DOCUMENTS 5,297,721 A * 3/1994 Schneider et al. ......... 228/180.1

FOREIGN PATENT DOCUMENTS

CN 1843684 A * 10/2006

OTHER PUBLICATIONS

Machine translation of CN1843684, 2006.*

* cited by examiner

*Primary Examiner* — Colleen P Dunn
*Assistant Examiner* — Rajinder Bajwa
(74) *Attorney, Agent, or Firm* — Sheppard Mullin; Daniel Yannuzzi; Jonathan Marina

(57) ABSTRACT

Materials having increased mobility after heating are disclosed. In one particular exemplary embodiment, the materials may be realized as a material which has reduced apparent molecular weight and/or viscosity and thus increased mobility after a heating process, and which consequently allows material residue to be more easily removed during subsequent cleaning processes. Such a material may be useful in any industrial process which requires heating the material followed by removing material residue.

25 Claims, No Drawings

MATERIALS HAVING INCREASED MOBILITY AFTER HEATING

CROSS-REFERENCE TO RELATED APPLICATIONS

This patent application claims priority to U.S. Provisional Application No. 60/975,912, filed Sep. 28, 2007, which is hereby incorporated by reference herein in its entirety.

FIELD OF THE DISCLOSURE

The present disclosure relates generally to materials having properties which change with temperature and, more particularly, to materials having increased mobility after heating.

BACKGROUND OF THE DISCLOSURE

Many industrial processes involve liquid deposition, then heating, followed by a liquid cleaning procedure to remove residue. For example, in a flip chip attachment process, solder flux may be applied by jetting, pin transferring, or printing the solder flux on a substrate prior to placing the flip chip on the substrate. In many cases, the solder flux must have a relatively high viscosity in order to hold the flip chip in place before a solder joint is formed. Such a solder joint may be formed in a reflow process (i.e., heating a flip chip assembly in a reflow oven). After the reflow process, corrosive solder flux residue may remain. Such solder flux residue may be removed by water or some other cleaning agent to prevent corrosion. However, as a result of heating in the reflow process, the solder flux residue typically has a viscosity that is much higher than that of the original solder flux due to evaporation of volatile components, which typically have lower viscosities. This may make removing the solder flux residue more difficult, particularly when trying to access low clearance spaces (e.g., underneath the flip chip) with water or some other cleaning agent.

Another example of a soldering process is car radiator manufacturing and repairing. In such a process, viscous solder flux is typically applied to a copper tube and a fitting cup to facilitate the soldering process. During the soldering process, the solder flux is heated and a solder flux residue may remain. After the soldering process, the solder flux residue may be removed by water or some other cleaning agent to prevent corrosion. However, as discussed above, the solder flux residue typically has a higher viscosity than that of the original solder flux, which may make removing the solder flux residue more difficult.

Removing solder flux residue has never been a particularly easy task. And it is getting more difficult as a result of a ban on chlorofluorocarbons (CFC's) and other halide chemicals as cleaning solvents. Attempts to lessen the difficulty of removing solder flux residue have largely focused on the use of special defluxing agents and special cleaning instruments and processes. However, all of these attempts have drawbacks. For example, many defluxing agents are flammable and thus may create a fire hazard. Also, special cleaning instruments can be expensive to design, manufacture, and maintain. Further, special cleaning processes often include multiple time-consuming, and thus costly, steps.

In view of the foregoing, it may be understood that there are significant problems and shortcomings associated with current techniques for cleaning or otherwise removing solder flux residue from various surfaces after a heating process.

SUMMARY OF THE DISCLOSURE

Materials having increased mobility after heating are disclosed. In one particular exemplary embodiment, the materials may be realized as a material which has reduced apparent molecular weight and/or viscosity and thus increased mobility after a heating process, and which consequently allows material residue to be more easily removed during subsequent cleaning processes. Such a material may be useful in any industrial process which requires heating the material followed by removing material residue.

For example, a material having increased mobility after heating in accordance with the present disclosure may comprise two or more ingredients, wherein at least two of the ingredients have an association force within the material that, prior to heating, causes an increase in viscosity of the material after the at least two ingredients are combined in the material, wherein at least one of the at least two ingredients has a lower boiling point than another of the at least two ingredients, wherein the at least one ingredient having the lower boiling point is substantially evaporated from the material after heating the material, thereby substantially eliminating the association force within the material and causing a decrease in viscosity, and an increase in mobility, of the material after heating.

Alternatively, a material having increased mobility after heating in accordance with the present disclosure may comprise two or more ingredients, wherein at least two of the ingredients have an association force within the material that, prior to heating, causes an increase in an apparent molecular weight of the material after the at least two ingredients are combined in the material, wherein at least one of the at least two ingredients has a lower boiling point than another of the at least two ingredients, wherein the at least one ingredient having the lower boiling point is substantially evaporated from the material after heating the material, thereby substantially eliminating the association force within the material and causing a decrease in apparent molecular weight, and an increase in mobility, of the material after heating.

Alternatively still, a material having increased mobility after heating in accordance with the present disclosure may comprise two or more ingredients, wherein at least two of the ingredients have an association force within the material that, prior to heating, causes an increase in viscosity of the material after the at least two ingredients are combined in the material, wherein at least one of the at least two ingredients has a lower decomposition temperature than another of the at least two ingredients, wherein the at least one ingredient having the lower decomposition temperature substantially decomposes in the material after heating the material, thereby substantially eliminating the association force within the material and causing a decrease in viscosity, and an increase in mobility, of the material after heating.

Alternatively still, a material having increased mobility after heating in accordance with the present disclosure may comprise two or more ingredients, wherein at least two of the ingredients have an association force within the material that, prior to heating, causes an increase in an apparent molecular weight of the material after the at least two ingredients are combined in the material, wherein at least one of the at least two ingredients has a lower decomposition temperature than another of the at least two ingredients, wherein the at least one ingredient having the lower decomposition temperature substantially decomposes in the material after heating the material, thereby substantially eliminating the association force within the material and causing a decrease in apparent molecular weight, and an increase in mobility, of the material after heating.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

DETAILED DESCRIPTION OF EXEMPLARY EMBODIMENTS

Materials having increased mobility after heating are disclosed in accordance with an embodiment of the present disclosure. A technique for forming such materials is to establish a temporary association force within the materials themselves, such as an acid-base association force. This kind of association force can cause an increase in apparent molecular weight and an increase in viscosity of the material when the material is formed. After a heating process, one or more critical ingredients of the material evaporates or decomposes, thus eliminating the association force, causing a decrease in apparent molecular weight and/or a decrease in viscosity, and consequently an increase in mobility. The evaporation of the one or more ingredients can be the result of the one or more ingredients having a lower boiling point than another ingredient. Similarly, the decomposition of the one or more ingredients can be the result of the one or more ingredients having a lower decomposition temperature than another ingredient. This technique may be further explained in reference to the following examples, which describe actual experimental results.

Example 1

A liquid flux was formed by mixing 40 g tripropylamine (CAS No. [102-69-2], molecular weight 143.27) and 80 g of octanoic acid (CAS No. [124-07-2], molecular weight 144.21). The viscosity of the tripropylamine at 23° C. was 0.5 centipoise (cP), measured by a corn-plate viscometer (Brookfield DV-II+). The viscosity of the octanoic acid was 5.2 cP, measured by the same viscometer. During mixing, the mixture got warmer without any external heating being applied, indicating that some kind of association was being formed. Indeed, in this example, the mixture produced a flux having an acid-base association according to the following formula:

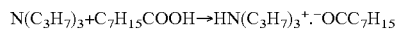

The apparent molecular weight of the flux was 287.48. The viscosity of the flux at 23° C. was 21 cP, measured by the same viscometer.

Five grams of the flux was sent through a forced air convection oven (BTU VIP70) using a time-temperature profile with a peak temperature of 180° C. and a 6-7 minute transition time from room temperature to peak temperature. This profile is suitable for soldering pure indium metal or an indium alloy. After reflow, flux residue was put into a desiccator to cool down to room temperature. Approximately 91 w/w % of the flux was lost due to evaporation. The viscosity of the flux residue at 23° C. was 7 cP, measured by the same viscometer. Thus, there was a significant decrease in the viscosity of the flux after heating. In this example, the organic base tripropylamine was lost during heating because tripropylamine has a lower boiling point (155° C.) than octanoic acid (237° C.).

Example 2

A dipping flux was formed by mixing 50 g butyric acid (CAS No. [107-92-6]) and 50 g triethanolamine (CAS No. [102-71-6]). Before reflow, the viscosity of the flux was 410 cP. The same reflow treatment as Example 1 resulted in a 51 w/w % weight loss and a reduction in viscosity to 215 cP. In this example, the acid material butyric acid was vaporized due to its significantly lower boiling point (162° C.) than that of triethanolamine (>350° C.).

Example 3

A dipping flux was formed by mixing 30 g malonic acid (CAS No. [141-82-2]) and 60 g ARAPHEN KB 100 (CAS No. [61791-14-8]) (coco amine with 10 polyethylene glycol units). Before reflow, the viscosity of the flux was 1600 cP. Approximately 5 g of the flux was heated in a BTU reflow oven using a profile with a peak temperature of 245° C. and about a 6 minute transition time from room temperature to peak temperature. This profile is typical for soldering Sn—Ag—Cu lead-free alloys. The weight loss of the flux was 35 w/w %, and the viscosity of the flux residue was 105 cP. In this example, the malonic acid was lost because malonic acid decomposes at its melting point (132-135° C.).

In view of the foregoing, it should be noted that the temporary association force may be formed by, but is not limited to, an acid-base interaction. This temporary association force is desirable for many processes, such as a soldering process because it increases the viscosity of solder fluxes and therefore helps to hold components before a solder joint is formed. The loss of this association force may be the result of a low boiling point or the decomposition of one or more ingredients.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A material having increased mobility after heating, the material comprising:
two or more ingredients, wherein at least two of the ingredients have an association force within the material that, prior to heating, causes an increase in viscosity of the material after the at least two ingredients are combined in the material, wherein at least one of the at least two ingredients has a lower boiling point than another of the at least two ingredients, wherein when the at least one ingredient having the lower boiling point is substantially evaporated from the material after heating the material, thereby substantially eliminating the association force within the material, and the material has an overall decrease in viscosity, and an overall increase in mobility, after heating.

2. The material of claim 1, wherein the material is a liquid solder flux that has reduced viscosity, and increased mobility, after heating in a reflow process.

3. The material of claim 1, wherein the material is a dipping solder flux that has reduced viscosity, and increased mobility, after heating in a reflow process.

4. The material of claim 1, wherein the association force is acid-base association force.

5. The material of claim 4, wherein the at least one ingredient having the lower boiling point is an acid ingredient, wherein the acid-base association force is substantially eliminated within the material after heating the material due to evaporation of the acid ingredient.

6. The material of claim 4, wherein the at least one ingredient having the lower boiling point is a base ingredient, wherein the acid-base association force is substantially eliminated within the material after heating the material due to evaporation of the base ingredient.

7. A material having increased mobility after heating, the material comprising:
two or more ingredients, wherein at least two of the ingredients have an association force within the material that, prior to heating, causes an increase in an apparent molecular weight of the material after the at least two ingredients are combined in the material, wherein at least one of the at least two ingredients has a lower boiling point than another of the at least two ingredients, wherein the at least one ingredient having the lower boiling point is substantially evaporated from the material after heating the material, thereby substantially eliminating the association force within the material and causing a decrease in apparent molecular weight, and an increase in mobility, of the material after heating.

8. The material of claim 7, wherein the material is a liquid solder flux that has reduced viscosity, and increased mobility, after heating in a reflow process.

9. The material of claim 7, wherein the material is a dipping solder flux that has reduced viscosity, and increased mobility, after heating in a reflow process.

10. The material of claim 7, wherein the association force is acid-base association force.

11. The material of claim 10, wherein the at least one ingredient having the lower boiling point is an acid ingredient, wherein the acid-base association force is substantially eliminated within the material after heating the material due to evaporation of the acid ingredient.

12. The material of claim 10, wherein the at least one ingredient having the lower boiling point is a base ingredient, wherein the acid-base association force is substantially eliminated within the material after heating the material due to evaporation of the base ingredient.

13. A material having increased mobility after heating, the material comprising:
two or more ingredients, wherein at least two of the ingredients have an association force within the material that, prior to heating, causes an increase in viscosity of the material after the at least two ingredients are combined in the material, wherein at least one of the at least two ingredients has a lower decomposition temperature than another of the at least two ingredients, wherein the at least one ingredient having the lower decomposition temperature substantially decomposes in the material after heating the material, thereby substantially eliminating the association force within the material and causing a decrease in viscosity, and an increase in mobility, of the material after heating.

14. The material of claim 13, wherein the association force is acid-base association force.

15. The material of claim 14, wherein the at least one ingredient having the lower decomposition temperature is an acid ingredient, wherein the acid-base association force is substantially eliminated within the material after heating the material due to decomposition of the acid ingredient.

16. The material of claim 14, wherein the at least one ingredient having the lower decomposition temperature is a base ingredient, wherein the acid-base association force is substantially eliminated within the material after heating the material due to decomposition of the base ingredient.

17. A material having increased mobility after heating, the material comprising:
two or more ingredients, wherein at least two of the ingredients have an association force within the material that, prior to heating, causes an increase in an apparent molecular weight of the material after the at least two ingredients are combined in the material, wherein at least one of the at least two ingredients has a lower decomposition temperature than another of the at least two ingredients, wherein the at least one ingredient having the lower decomposition temperature substantially decomposes in the material after heating the material, thereby substantially eliminating the association force within the material and causing a decrease in apparent molecular weight, and an increase in mobility, of the material after heating.

18. The material of claim 17, wherein the association force is acid-base association force.

19. The material of claim 18, wherein the at least one ingredient having the lower decomposition temperature is an acid ingredient, wherein the acid-base association force is substantially eliminated within the material after heating the material due to decomposition of the acid ingredient.

20. The material of claim 18, wherein the at least one ingredient having the lower decomposition temperature is a base ingredient, wherein the acid-base association force is substantially eliminated within the material after heating the material due to decomposition of the base ingredient.

21. A material having increased mobility after heating, the material comprising:
a plurality of ingredients,
the ingredients having a temporary interaction force causing the ingredients to temporarily associate with each other,
the temporary association increasing the viscosity of the material;
wherein the ingredients lose the temporary interaction force when heated to substantially evaporate or decompose at least one of the ingredients, thereby reducing the overall viscosity or increasing the overall mobility of the material.

22. The material of claim 21, wherein the material is an electronic industry solder flux and wherein the heating is a reflow process.

23. The material of claim 21, wherein the temporary interaction force is an acid-base interaction force.

24. The material of claim 23, wherein the loss of the acid-base interaction force is due to the evaporation of an acid or base ingredient.

25. The material of claim 23, where the loss of the acid-base interaction force is due to the decomposition of an ingredient.

* * * * *